United States Patent [19]

Kobayashi et al.

[11] Patent Number: 5,004,178

[45] Date of Patent: Apr. 2, 1991

[54] SEAT BELT APPARATUS

[75] Inventors: Kyoji Kobayashi; Takeo Furuya, both of Yokohama, Japan

[73] Assignee: Jidosha Denki Kogyo K.K., Kanagawa, Japan

[21] Appl. No.: 422,349

[22] Filed: Oct. 16, 1989

[30] Foreign Application Priority Data

Oct. 17, 1988 [JP] Japan .................. 63-261257
Oct. 17, 1988 [JP] Japan .................. 63-261258

[51] Int. Cl.⁵ .................. B60R 22/42; B60R 22/46
[52] U.S. Cl. .................. 242/107; 280/806; 242/107.2
[58] Field of Search .................. 242/107, 107.2; 280/806, 807, 808; 297/476–480

[56] References Cited

U.S. PATENT DOCUMENTS

| 4,597,545 | 7/1986 | Burghardt | 280/806 X |
| 4,647,071 | 3/1987 | Tabata | 242/107.2 X |
| 4,718,148 | 1/1988 | McKernon et al. | 242/107.2 X |
| 4,840,325 | 6/1989 | Higuchi et al. | 242/107.2 X |

Primary Examiner—Stuart S. Levy
Assistant Examiner—Steven M. duBois
Attorney, Agent, or Firm—Sughrue, Mion, Zinn, Macpeak & Seas

[57] ABSTRACT

A seat belt apparatus for use in the restraining of a person on a seat of the vehicle includes a take-up mechanism, a webbing strap having one end secured to the take-up mechanism windably and the other end secured to the vehicle body by pulling it out from the take-up mechanism, a webbing detection mechanism provided near the take-up mechanism for detecting the pulled-out amount of the webbing strap and a restraining mechanism for restraining the movement of the webbing strap. The restraining mechanism may be released for a given time by a switch or the sensing of a shock. A webbing strap fold-up mechanism for folding-up the webbing strap in the direction of the length is provided and acts upon the sensing of shock so as to fold up excess strap when the webbing strap detecting mechanism detects that the webbing strap is pulled-out an amount more than a predetermined amount.

3 Claims, 5 Drawing Sheets

SEAT BELT APPARATUS

BACKGROUND OF THE INVENTION

The present invention relates to a seat belt apparatus for use in the restraining of a person on a seat of the vehicle by webbing strap.

The conventional seat belt apparatus is disclosed on the chapter Equipment paragraph 15-3 in the Manual of Vehicle Engineering Vol. 7 Revised Edition, May 31, 1983. The seat belt apparatus described in the above literature is shown in FIG. 5 by a schematic view.

That is, the seat belt apparatus is a seat belt of three point attachment type which is provided with a take-up mechanism 100 secured to the under portion of a center pillar $B_1$ at the outer side oi a seat S. The take-up mechanism 100 is provided with a webbing strap 101 therein in such a manner that one end oi the webbing strap is secured to the take-up mechanism 100 windably, and the other end of the webbing strap slidably passes through a relay anchor $A_1$ which is secured to the upper portion oi the center pillar $B_1$ at the outer side of the seat S and a thrusting tongue T and is secured to an anchor $A_2$ attached to a floor vehicle body side $B_2$ at the center side of the seat S.

A buckle B for engaging the tongue T detachably is also secured to the floor $B_2$, at the center side of the seat S.

This take-up mechanism 100 is so constructed that when it is in a free mode after pulling out the webbing strap 101, the webbing strap 101 is automatically taken up and when, for example, large shock or the like is sensed, the pull-out and take-up operation of the webbing strap is stopped, thereby locking the webbing strap 101 at current pull-out amount thereof.

In this case, the automatic take-up force of the webbing strap 101 by the take-up mechanism 100 is so small that the person does not feel an oppressive sensation in case of taking up the webbing strap.

After sitting on the seat S, person pulls out the webbing strap 101 from the take-up mechanism 100, pulls it across the chest obliquely, across the waist portion and hook on the tongue T to the buckle B, so as to restrain the person on the seat S.

For example, when large shock or the like is sensed, the take-up mechanism 100 stops the pull-out or take-up operation of the webbing strap to hold the condition that the person is restrained on the seat S.

In the above conventional seat belt apparatus, the take-up force of the webbing strap 101 by the take-up mechanism 100 is made so small that the person does not feel an oppressive sensation, and thus when the person moves his body while sitting on the seat S, the webbing strap 101 is also pulled out from the take-up mechanism 100 in accordance with his movement. Then, when the pull out and take-up operation of the webbing strap 101 from the take-up mechanism 100 is stopped by the sensing of the shock or the like in a case where the webbing strap 101 is pulled out by an amount more than the pulled out amount capable of restraining the person on the seat S, the webbing strap 101 remains in the state that it is pulled out over the predetermined amount and becomes lose, and thus it can not restrain the person on the seat S. Even when the webbing strap 101 is pulled out over the predetermined amount thereof, it is desirable that the person may be restrained on the seat S.

SUMMARY OF THE INVENTION

It is an object of the present invention to overcome the above mentioned disadvantages of the conventional seat belt apparatus.

It is another object of the present invention to provide a seat belt apparatus capable of surely restraining the a person on the seat in the case of shock or the like even when the webbing strap is pulled out more than the predetermined amount.

The construction of the seat belt apparatus according to this invention for attaining the above-mentioned objects is characterized by having a sensor for sensing shock applied on a vehicle body, a take-up mechanism secured to a base, a webbing provided with one end secured to said take-up mechanism windably and another end capable of securing to the vehicle body by pulling out from the take-up mechanism, a webbing detecting mechanism provided with a magnet attached to said webbing at a predetermined position and a switch portion attached to the base for detecting pulled out length of the webbing, a restraining mechanism for restraining the webbing between a damping member and a damping arm, and for releasing said webbing from restraint only for a predetermined time according to switching operation or sensing of the shock by said sensor, and a webbing fold-up mechanism for folding up the webbing by sensing the shock applied on the vehicle body when said webbing is pulled up longer than predetermined length.

The seat belt apparatus according to this invention is provided with a sensor for sensing shock, a take-up mechanism for detecting pulled out length of the webbing, a restraining mechanism for restraining the webbing and releasing the restraint of said webbing only for predetermined time by sensing the shock and a webbing fold-up mechanism for folding up the webbing by sensing the shock when said webbing is pulled out longer than predetermined length, and it so structured that the webbing pulled out excessively from the take-up mechanism is withdrawing by folding up the webbing with said webbing fold-up body by a clash or the like. Therefore, it is so designed as to restrain the person on the seat securely even when the webbing is loose.

DETAILED EXPLANATION OF THE PREFERRED EMBODIMENTS

Now to the drawings, there is shown one embodiment of a seat belt apparatus according to the present invention.

Figure 1:
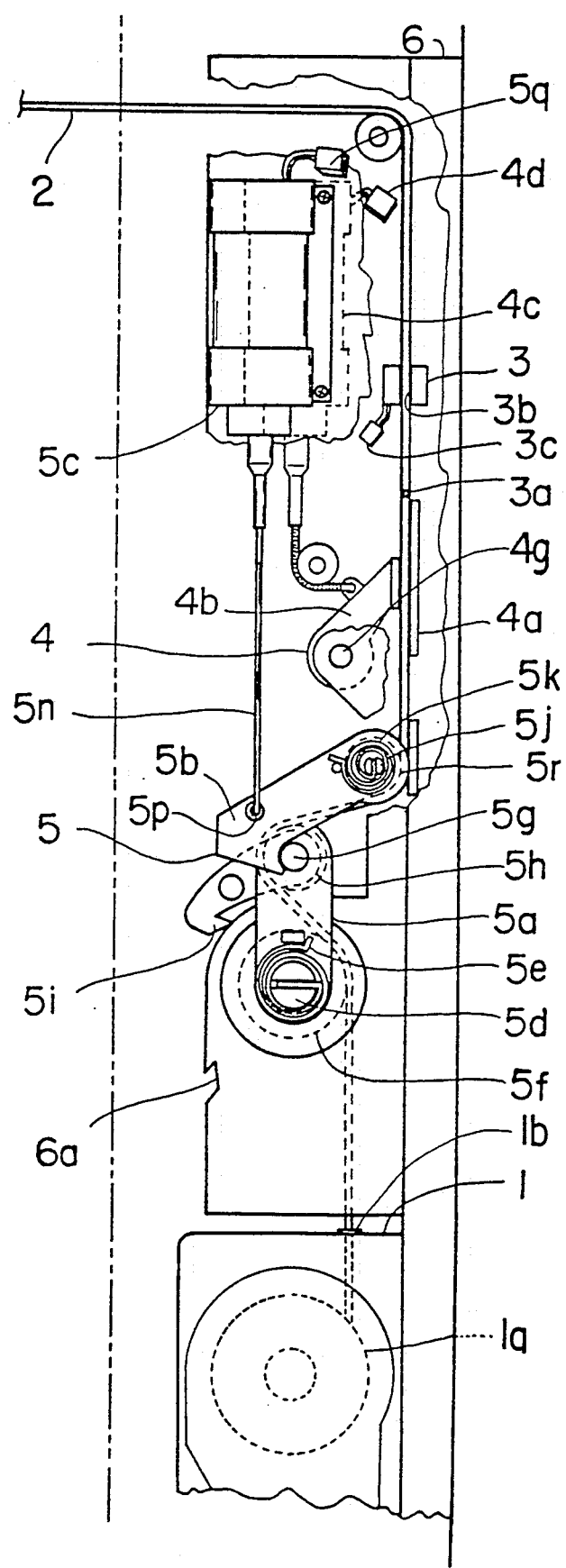
FIG. 1 is a partially cutaway side view showing a construction in of one embodiment of a seat belt apparatus according to the present invention prior to operation of the fold-up mechanism.
Figure 2:
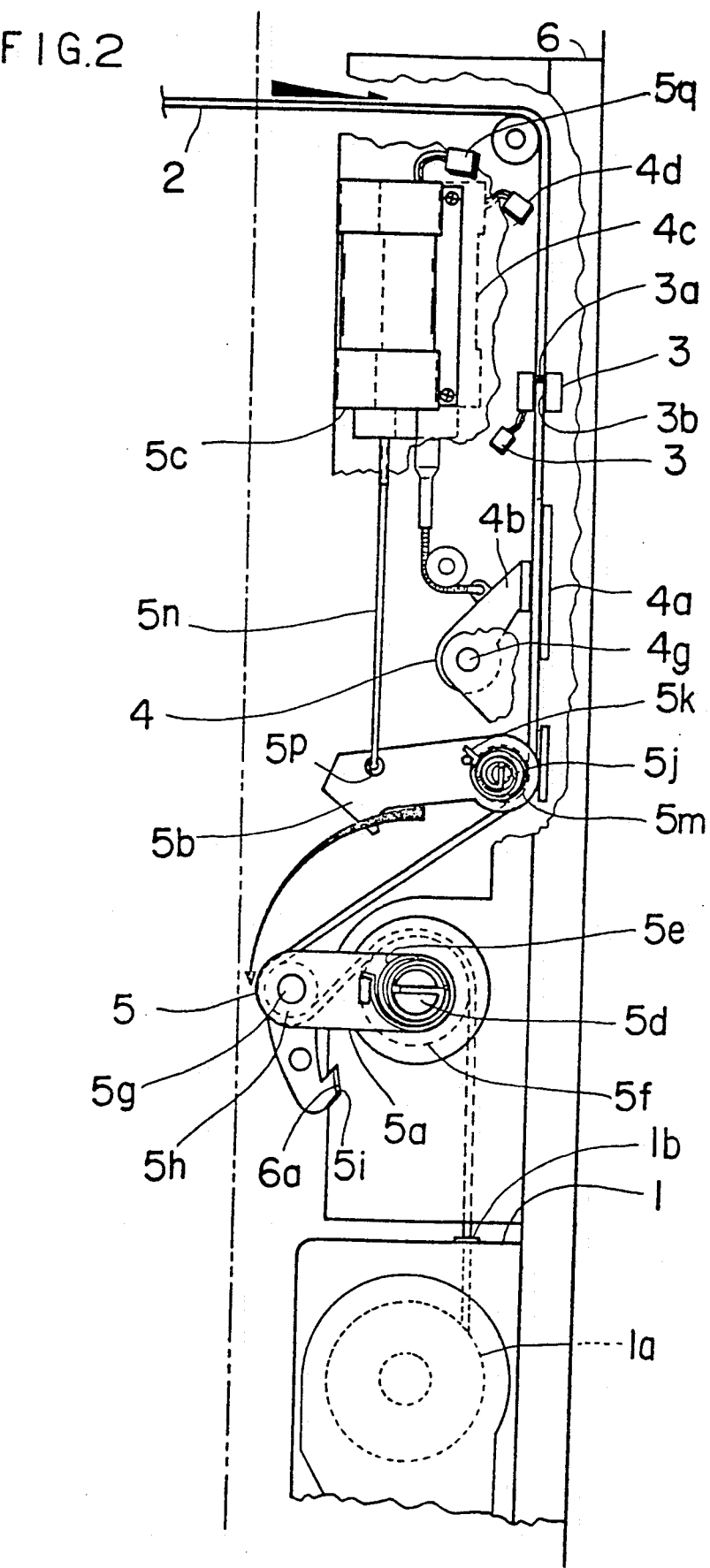
FIG. 2 is a partially cutaway side view showing the seat belt apparatus of FIG. 1 after operation of the fold-up mechanism.
Figure 3:
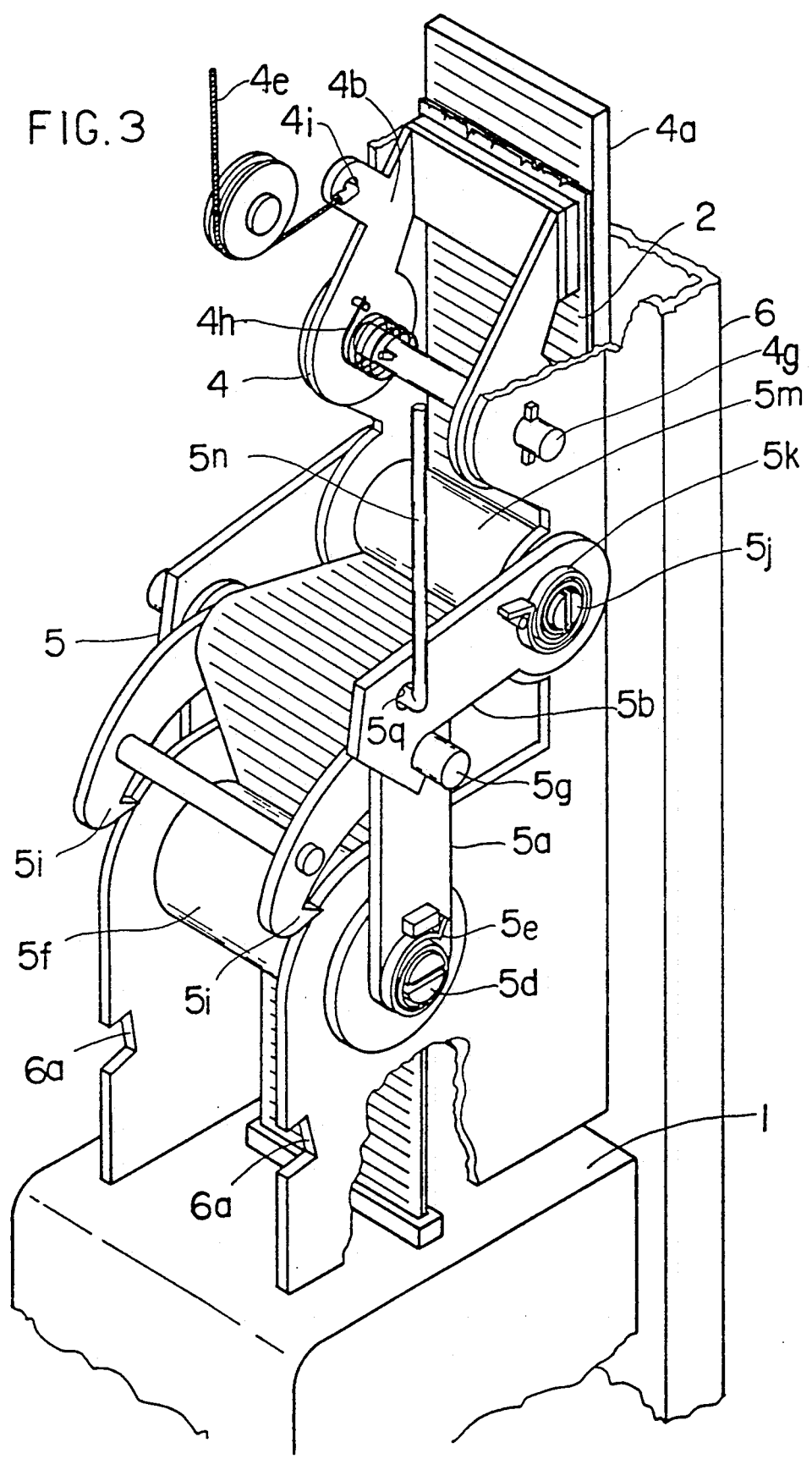
FIG 3 is a perspective view showing the seat belt apparatus shown in FIG. 1.

As shown in FIGS. 1 to 3, the the seat belt apparatus according to the present invention comprises a take-up mechanism 1 of an emergency locking type, a webbing strap 2, a webbing strap detection means 3 for detecting the pull-out amount of the webbing strap 2, a pretension mechanism 4 for arbitrarily restraining the pull-out amount of the webbing strap 2, and a webbing strap fold-up mechanism 5 for folding-up the webbing strap in the direction of the length by acting upon the sensing of shock applied to the vehicle body when the webbing strap detecting mechanism detects that the webbing strap is pulled out by an amount more than the predetermined amount thereof.

The seat belt apparatus according to the present invention further comprises a door detection switch 8, a reset switch 9 and a shock sensing switch 10 which are described later in detail in FIG. 4.

As shown in FIG. 1, the take-up mechanism 1 comprises a reel 1a for taking up the webbing strap 2 with a given taking-up force so that the webbing strap 2 is pulled out from its taken up condition against the taking up force of the reel.

The take-up mechanism 1 is also secured to lower portion of a vertically elongated flat frame base 6 as shown in FIG. 1 and includes an opening 1b provided in the upper end wall of the take-up mechanism, through which the pull-out or take-up of the webbing strap 2 takes place.

The take-up mechanism 1 further comprises a shock detecting means (not shown) for stopping the pull-out and take-up of the webbing strap 2 by making the reel 1a in a locking condition when large shock is sensed.

Figure 5:
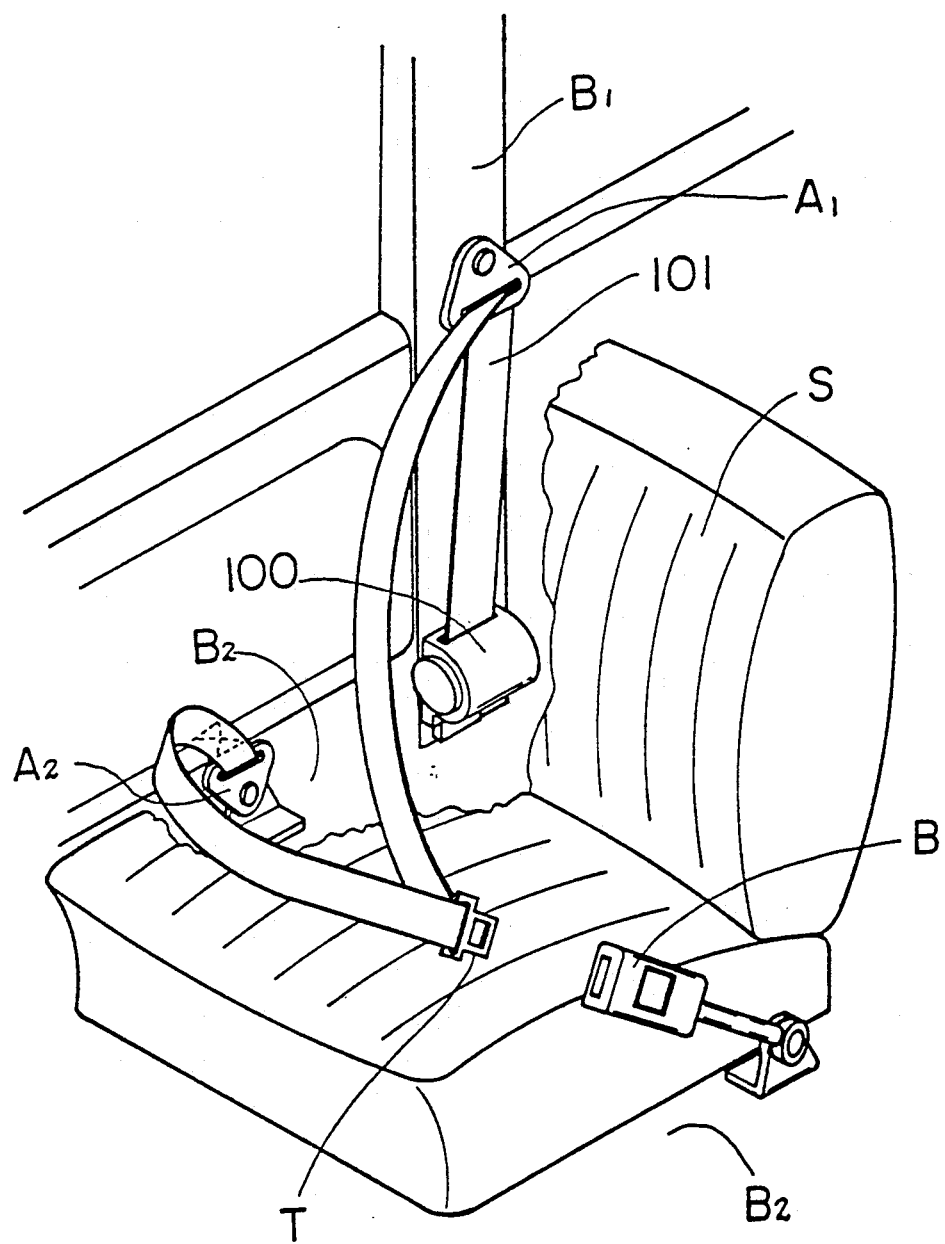
FIG. 5 is a perspective view showing the construction of the conventional seat belt apparatus.

The webbing strap 2 has one end attached to the take-up mechanism 1 windably and the other end (slidably passes) through a relay anchor A₁ secured to the upper portion of a center pillar B₁ at the outer side oi a seat S as shown in FIG. 5 as well as through a thrusting tongue T is fixed to an anchor A₂ which and is secured to the a floor B₂ at the center side of the seat S.

The webbing strap detection means 3 is a lead switch which comprises a detecting portion (magnet) 3a attached to the webbing strap 2 at given position, a switch portion 3b for effecting ON.OFF action in response to approach and departure of the detecting portion 3a relative to the switch portion, and an external coupling connector 3c for outputting the detected signal oi the switch portion 3b.

The webbing strap detecting means 3 is secured to the upper portion of a vertical elongated flat base 6 as shown in FIG. 1 and serves to detect that the webbing strap 2 is pulled out more than a predetermined amount. The detected signal of the detecting means 3 is outputted as, an output signal through the external coupling connector 3c.

The restraining mechanism 4 is secured as shown in FIG. 1, to the center portion of the base 6 and serves to restrain or release the webbing strap 2 for a predetermined period of time in response to the operation the webbing strap 2 of the door detecting switch 8 or the reset switch 9 or the shock sensing switch 10.

The restraining mechanism 4 comprises a damping member 4a such as a rubber sheet fixed to the base 6 at the right side of FIG. 1, a damping arm 4b for effecting a pressing and releasing operation on the webbing strap 2 in accordance with the rubber sheet 4a at the left side of FIG. 1, an electromagnetic solenoid 4c for effecting a pressing and releasing operation on the webbing strap 2 by operating the damping arm 4b through a wire 4e which is energized and deenergized by the changing over of the reset switch 9 (FIG. 4) mounted to, for example, a driving seat, and an external coupling connector 4d for supplying a given voltage to the electromagnetic solenoid 4c.

The damping arm 4b is rotatably supported to a pivotal shaft 4g secured to the frame base 6, a spring 4h which is subjected to an elastic deformation is provided between the damping arm 4b and the pivotal shaft 4g, and the damping arm 4b is biased by the spring 4h so toward the damping member 4a, that is, in the clockwise direction about the pivotal shaft 4g in FIG. 1.

The damping arm 4b further comprises a wire connecting portion 4i engaged to the wire 4e at the left side of FIG. 3.

When a given voltage is supplied to the electromagnetic solenoid 4c from the external coupling connector 4d by changing over the reset switch 9, the electromagnetic solenoid 4c is energized to drive the damping arm 4b. When the electromagnetic solenoid 4c is energized it attractes the wire 4e so that the damping arm 4b is rotated in the anticlockwise direction in FIG. 1 about the pivotal shaft 4g against the spring 4h to separate it from the webbing strap 2 thereby freeing the webbing strap. When the electromagnetic solenoid 4c is deenergized the wire 4e is returned to its original positron, so that the damping arm 4b is biased by the spring 4h and depresses the webbing strap 2, thereby restraining the webbing strap against the damping member 4a.

The webbing strap fold-up mechanism 5 folds up the webbing strap 2 in the direction of the length upon the sensing of shock when the webbing strap detecting means detects the pull-out of the webbing strap 2 beyond a predetermined amount.

The webbing strap fold-up mechanism 5 comprises a rotating or swing arm 5a provided to the base 6 rotatably, a hook 5b for locking and unlocking the swing arm 5a, and an electromagnetic solenoid 5c for operating the hook 5b.

The swing arm 5a is rotatably attached to a pivotal shaft 5d secured to the base 6 at the lower side thereof in FIG. 1 and engages to one end of a release spring 5e, the other end of which is secured to the pivotal shaft 5d, so that the swing arm 5a is biased in the anticlockwise direction in FIG. 1. The pivotal shaft 5d is fitted in a roller 5f, over which the webbing strap 2 is guided.

The swing arm 5a has a roller 5h provided at the end spaced from the roller 5f and at the upper side in FIG. 1. The webbing strap 2 is guided on the roller 5h. The swing arm 5a is also provided with an engaging piece 5i for locking the swing arm 5a in a notch 6a provided in the base 6 by fitting it therein when the swing arm 5a is rotated in the clockwise direction in FIG. 1.

The hook 5b is rotatably secured to a pivotal shaft 5j mixed to the base 6 as shown in FIG. 3 and engages one end of a spring 5k, the other end of which is fixed to the pivotal shaft 5j, so that the hook 5b is biased in the anticlockwise direction in FIG. 1 and thus a roller 5r guiding the webbing strap 2 is rotatably secured on the pivotal shaft 5j.

The hook 5b is provided with an opening 5p for inserting a rod 5n (described later) therein at the left side in FIG. 1. The rod 5n serves to connect the electromagnetic solenoid 5c thereto.

Figure 4:
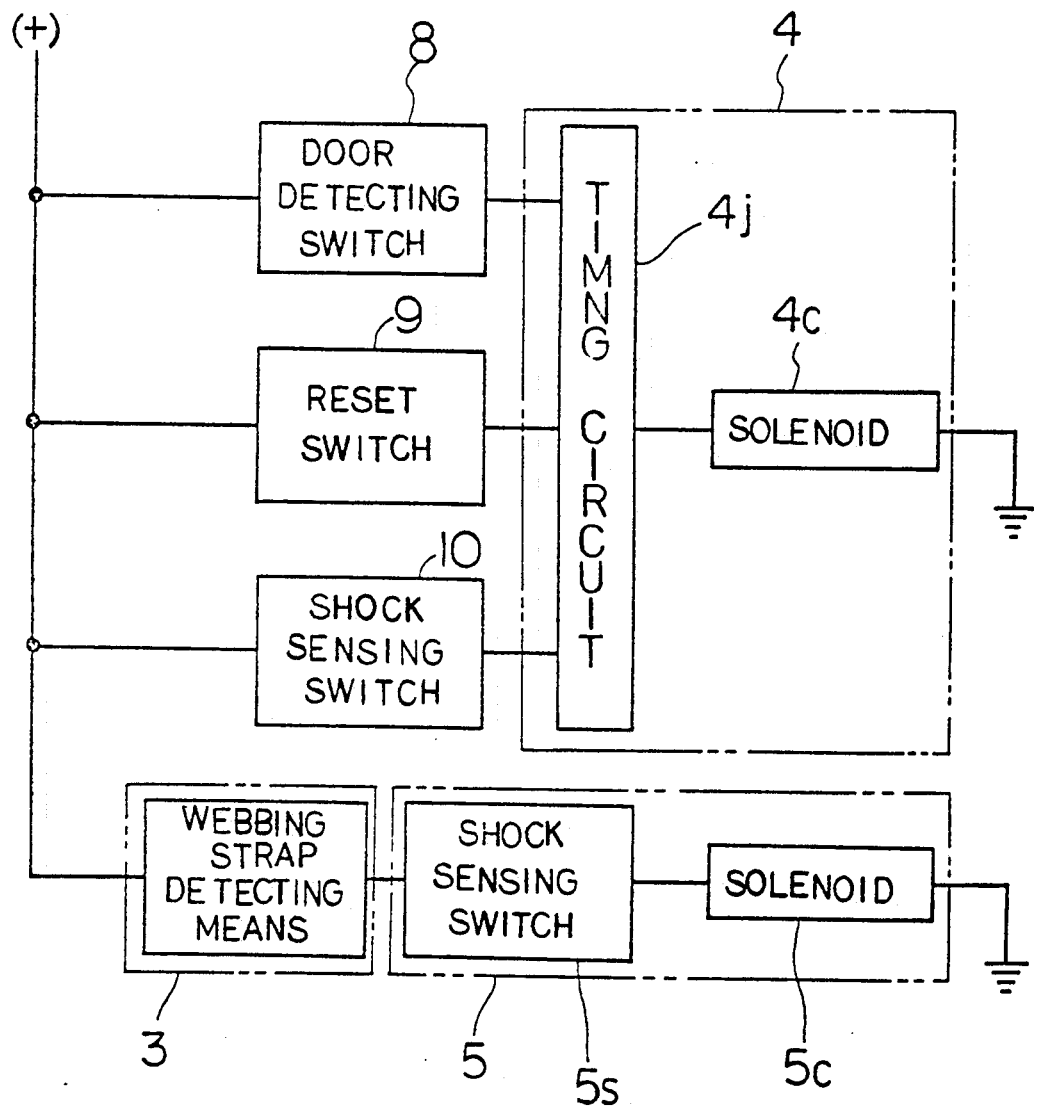
FIG. 4 is circuit diagram of the seat belt apparatus shown in FIG. 1.

The electromagnetic solenoid 5c is energized with the given voltage supplied by switching on a shock sensing switch 5s shown in FIG. 4 when the shock sensing switch 5s senses a shock and the webbing strap detecting means 3 signals that the pull-out amount of the webbing strap 2 is over the predetermined amount. The electromagnetic solenoid 5c comprises a rod 5n moving vertically in FIG. 1 when the solenoid 5c is energized and deenergized, and an external coupling connector 5q for supplying a given voltage to the electromagnetic solenoid 5c.

The rod 5n is inserted in the opening 5p provided in the hook 5b, and connected to the electromagnetic solenoid 5c, so that the hook 5b is rotated in the clockwise and anticlockwise direction in FIG. 1 when the electromagnetic solenoid 5c is energized and deenergized.

That is, the relationship between a force ($F_1$) by which the restraining mechanism 4 restrains the webbing strap 2, a force ($F_2$) by which the swing arm 5a of the webbing strap fold-up mechanism 5 is rotated in the anticlockwise direction in FIG. 1 with the webbing strap 2 thereon, and a force ($F_3$) by which the take-up mechanism 1 takes up the webbing strap 2, is as follows.

$$F_3 < F_1 < F_2$$

As shown in FIG. 4, the restraining mechanism 4 is provided with a timing circuit 4j for providing an output signal only for a predetermined time according to the input signals.

The door detecting switch 8 is attached near the driving seat side of the vehicle (not shown), and operates in such a manner that when the door is in the closed condition the switch 8 is in the switched off state and when the door is in the opened condition the switch is in the switched on state.

The reset switch 9 is attached in an accessible position for operation by the driver's hand in the driver's seat and is capable of switching on and off to adjust the pulled out length of the webbing strap 2.

The shock sensing switch 10 is attached to the outside of the vehicle for example, such as front bumper or rear bumper thereof and is switched on when a large shock is sensed.

As shown in FIG. 1, the end of the webbing strap pulled out from the take-up mechanism 1 is passed over roller 5f attached to the swing arm 5a of the webbing strap fold-up mechanism 5, and then passed over roller 5h secured to the swing arm 5a and further passed over the roller 5r attached to the hook 5b. The end of the webbing strap 2 is inserted between the rubber sheet 4a which is the damping member and the damping arm 4b and then inserted in the webbing strap detecting means 3 and finally secured to the vehicle body as shown in FIG. 5.

The restraining mechanism 4 is so constructed that a voltage is supplied to the electromagnetic solenoid 4c through the external coupling connector 4d and the reset switch 9 shown in FIG. 4, and the webbing strap fold-up mechanism 5 is so constructed that a voltage is supplied to the electromagnetic solenoid 5c through the external coupling connector 5q.

The hook 5b of the webbing strap fold-up mechanism 5 engages the lock pin 5g of the swing arm 5a so that it is in the locked state in the non-operated condition of the swing arm 5a as shown in FIG. 1.

As shown in FIG. 4, the door detecting switch 8, the reset switch 9 and the shock sensing switch 10 are connected at one end to a positive supply source (+) respectively. and the other end of respective switches is connected to the timing circuit 4j of the restraining mechanism 4, respectively. The output terminal of the timing circuit 4j is connected to one end of the solenoid 4c, the other end of which is connected to the grounded point.

The webbing strap detecting means 3 has one end of connected to the positive supply source (+) and the other end connected to the input side of the shock sensing switch 5s of the webbing strap fold up mechanism 5, and thus the output of the shock sensing switch 5s is connected to one end of the solenoid 5c, the other end of which is connected to the ground point.

In the operating mode, a person sits on the seat as in FIG. 5, and the webbing strap 2 is pulled out from the take up mechanism 1 and secured to the vehicle body as in FIG. 5, thereby restraining the person on the seat.

In the operating mode, when the driver feels an oppressive sensation due to the taking-up force of the webbing strap 2 by the take-up mechanism 1, the reset switch 9 is operated so that the voltage of the positive supply source (+) is applied from the reset switch 9 to the grounded point through the timing circuit 4j and the electromagnetic solenoid 4c of the restraining mechanism 4, thereby energizing the solenoid 4c for a predetermined time controlled by the timing circuit 4j.

The damping arm 4b of the restraining mechanism 4 is rotated in the anticlockwise direction in FIG. 1 to separate it from the webbing strap thereby providing free movement of the webbing strap 2, and then the damping arm 4b is returned in the clockwise direction and presses the webbing strap 2 to restrain it after the webbing strap 2 has been pulled out by the desired amount.

When the door the at driver side is changed from the closed state to the opened state, the door detecting switch 8 is changed over so that the voltage of the positive supply source (+) is supplied from the door detecting switch 8 to the grounded point through the timing circuit 4j and the electromagnetic solenoid 4c of the pretension mechanism 4, thereby energizing the solenoid 4c for a time determined by the timing circuit 4j and thus the webbing strap 2 is restrained after it is pulled out from the take-up mechanism 1 as in the operation of the reset switch 9.

In any case, the webbing strap detecting means 3 generates output signals when the pulled-out amount of the webbing strap 2 is increased over a predetermined amount.

If a large shock or the like is sensed when the pulled-out amount of the webbing strap 2 is over the predetermined amount, the shock sensing switch 10 becomes switched to the on state and then the shock sensing switch 5s of the webbing strap fold-up mechanism 5 becomes switched to the on state, and the take-up mechanism 1 stops the pull-out and the take-up operation of the webbing strap 2.

When the shock sensing switch 10 becomes switched to the on state, the voltage of the positive supply source (+) is supplied from the shock sensing switch 10 to the ground point through the timing circuit 4j and the solenoid 4c of the restraining mechanism 4, thereby energizing the solenoid 4c for a determined by the timing circuit 4j. At the same time, the shock sensing switch 5s of the webbing strap fold-up mechanism 5 becomes switched to the on state, so that the voltage of the positive supply source (+) is supplied from the webbing strap detecting means 3 to the grounded point through the shock sensing switch 5s and the electromagnetic solenoid 5c of the webbing strap fold-up mechanism 5, thereby energizing the solenoid 5c.

When the electromagnetic solenoid 4c of the restraining mechanism 4 is energized for the predetermined time with the timing circuit 4j, the damping arm 4b is rotated in the anticlockwise direction in FIG. 1 and thus separated from the webbing strap 2 thereby allowing free movement of the strap, and then the damping arm 4b is again rotated in the clockwise direction in FIG. 1 and thus presses the webbing strap 2, thereby obtaining the restrained condition thereof.

The electromagnetic solenoid 5c of the webbing strap fold-up mechanism 5 is also energized in addition to the energizing of the solenoid 4c, and thus the hook 5b is released from the lock pin 5g, so that the swing arm 5a is rotated in the anticlockwise direction in FIG. 1 by the release spring 5e until the engage piece 5i is fitted in the notch 6a of the base 6.

With the rotation of the swing arm 5a in the anticlockwise direction in FIG. 1, the other roller 5h is separated from the roller 5r and the take-up mechanism 1 stops the pull-out and the take-up operation of the webbing strap 2 at its one end, so that the webbing strap 2 is folded up in the longitudinal direction only when the restraining mechanism 4 allows the webbing strap 2 to be in a free state, and the webbing strap 2 is moved in the direction that the pulled-out amount of the strap is taken upon folded and after the predetermined time the webbing strap 2 is locked by the restraining mechanism 4.

In this way, the webbing strap 2 is locked in a state in which the pulled-out length of tape is shortened so that the driver is restrained on the seat, thereby obtaining security.

In order to restore the seat belt apparatus to the normal state it is possible to return the serving arm 5a back to the position shown in FIG. 1 by disengaging the piece 5i from the notch 6a of the base 6 using any suitable means.

What is claimed is:

1. A seat belt apparatus comprising:
   a sensor for sensing shock applied on a vehicle body;
   take-up means secured to a base on said body;
   a webbing having one end secured to said take-up mechanism for winding thereon and another end capable of being secured to the vehicle body upon being pulled out from the take-up mechanism;
   webbing detecting means provided with a magnet attached to said webbing at a predetermined position and a switch means operable by said magnet and attached to the base for detecting a pulled out length of webbing;
   restraining means for restraining the webbing between a damping member and a damping arm, and for releasing said webbing from restraint only for a predetermined time according to a switching operation or sensing of a shock by said sensor; and
   webbing fold-up means for folding-up the webbing upon sensing a shock applied on the vehicle body when said detecting means detects that said webbing is pulled-up longer than a predetermined length.

2. A seat belt apparatus as set forth in claim 1, wherein said restraining means includes springs means operating said damping arm to restrain the webbing by pressing said webbing on the damping member and solenoid means for releasing the webbing from restraint by holding the damping arm away from the webbing when excited.

3. A seat belt apparatus as et forth in claim 2, wherein said fold-up mechanism comprises:
   a further solenoid means;
   a hook connected to said further solenoid means through a rod; and
   a swing arm engaging said webbing and energized by a spring and provided with a lock pin and an engaging piece;
   said webbing being folded-up by movement of said arm until the engaging piece of the swing arm is fitted in a notch of the base by rotating the swing arm with the spring when the hook is disengaged from the lock pin of the swing arm by said further solenoid means.

* * * * *